United States Patent
George

(10) Patent No.: US 6,297,600 B1
(45) Date of Patent: Oct. 2, 2001

(54) BLANKED DYNAMIC FOCUS POWER SUPPLY TRANSIENT ELIMINATION

(75) Inventor: John Barrett George, Carmel, IN (US)

(73) Assignee: Thomson Licensing, S.A., Boulogne (FR)

( * ) Notice: Subject to any disclaimer, the term of this patent is extended or adjusted under 35 U.S.C. 154(b) by 0 days.

(21) Appl. No.: 09/343,737

(22) Filed: Jun. 30, 1999

(51) Int. Cl.$^7$ .................................................. G09G 1/04
(52) U.S. Cl. ................................... 315/386; 315/382
(58) Field of Search ........................ 315/382, 382.1, 315/403, 408, 411, 370, 387, 384, 386, 383

(56) References Cited

U.S. PATENT DOCUMENTS

| | | | |
|---|---|---|---|
| 4,129,806 | * 12/1978 | Haferl | 315/370 |
| 4,823,052 | * 4/1989 | Onozawa | 315/408 |
| 4,956,587 | * 9/1990 | Kitou et al. | 315/408 |
| 5,036,260 | * 7/1991 | George | 315/384 |
| 5,486,741 | * 1/1996 | George | 315/382 |
| 6,118,233 | * 9/2000 | Craig et al. | 315/382 |
| 6,137,245 | * 10/2000 | Hsieh | 315/383 |

* cited by examiner

Primary Examiner—Don Wong
Assistant Examiner—Trinh Vo Dinh
(74) Attorney, Agent, or Firm—Joseph S. Tripoli; Joseph J. Laks; Daniel E. Sragow

(57) ABSTRACT

In order to accurately measure a low current bias in an automatic kine bias (AKB) circuit during several video lines that immediately follow vertical retrace, dynamic focus is interrupted by deactivating a dynamic focus voltage amplifier. The amplifier draws its power from a horizontal flyback transformer. In order to avoid a horizontal transient which may occur when the dynamic focus voltage amplifier is reactivated after being deactivated during a vertical blanking interval, the dynamic focus amplifier draws a current during vertical blanking which approximates the average current drawn during vertical scan.

8 Claims, 2 Drawing Sheets

BLANKED DYNAMIC FOCUS POWER SUPPLY TRANSIENT ELIMINATION

The invention relates to a beam landing focus correction arrangement.

BACKGROUND

An image displayed on a cathode ray tube (CRT) may suffer from imperfections or distortions such as defocusing that is incident to the scanning of the beam on the CRT. Such imperfections or distortions occur because the distance from the electron gun of the CRT to the faceplate varies markedly as the beam is deflected, for example, in the horizontal direction. Reducing the defocusing that occurs as the beam is deflected in the horizontal direction, for example, may be obtained by developing a dynamic focus voltage having a parabolic voltage component at the horizontal rate and applying the dynamic focus voltage to a focus electrode of the CRT for dynamically varying the focus voltage. It is known to derive the parabolic voltage component at the horizontal rate from an S-correction voltage developed in an S-shaping capacitor of a horizontal deflection output stage.

The CRT that employs dynamic focus may have internal wiring that places the dynamic focus voltage close to, for example, the blue electron gun. In normal operation, the proximity to the blue electron gun may not cause any problem. However, when a low current bias measurement is made in an automatic kine bias (AKB) circuit, during several video line times that immediately follow vertical retrace, referred to as the AKB measurement interval, stray coupling of the horizontal component of the dynamic focus voltage may introduce an error in the biasing of the cathode electrode of the blue electron gun. As a result, the bias of the blue electron gun may not track the bias of the green and red electron guns. This may lead to unacceptable background color temperature changes.

It may be desirable to remove the horizontal dynamic focus voltage component from the focus electrode during the AKB measurement interval. Thereby, the undesirable coupling to the focus electrode is, advantageously, eliminated. During the AKB measurement interval, the value of the focus voltage may drift, due to the removal of the dynamic focus voltage component. After the end of the AKB measurement interval, a significant transient of the focus voltage may occur when the focus voltage is returned to its proper value.

It may be desirable to address a problem of picture distortion that occurs when the dynamic focus high voltage amplifier is powered with a deflection-derived power supply, especially when the horizontal frequency is a multiple of normal broadcast horizontal frequency. The dynamic focus signal is amplified to very high peak to peak voltages. The amplifier that does this job uses more power when operated at a high frequency, such as horizontal deflection frequencies in excess of 30 kHz, such as those used for multimedia and HDTV than it does for relatively low frequency 15 kHz used in conventional TV. When the high frequency variations cease during vertical blanking, the current drawn by the amplifier is greatly reduced. This causes a loading transient at the power source. If the power source is also providing scan deflection for the picture tube, as is often convenient, this loading transient may cause a distortion in the picture, such as width modulation ringing, that appears as wiggles in vertical lines in the top of the picture.

SUMMARY OF THE INVENTION

The problem of changes in deflection loading can be solved by designing the amplifier to draw nearly the same average current during vertical blanking that is drawn during normal dynamic focus operation. This strategy eliminates the undesired transient in deflection current.

DESCRIPTION OF THE PREFERRED EMBODIMENTS

Figure 1A:
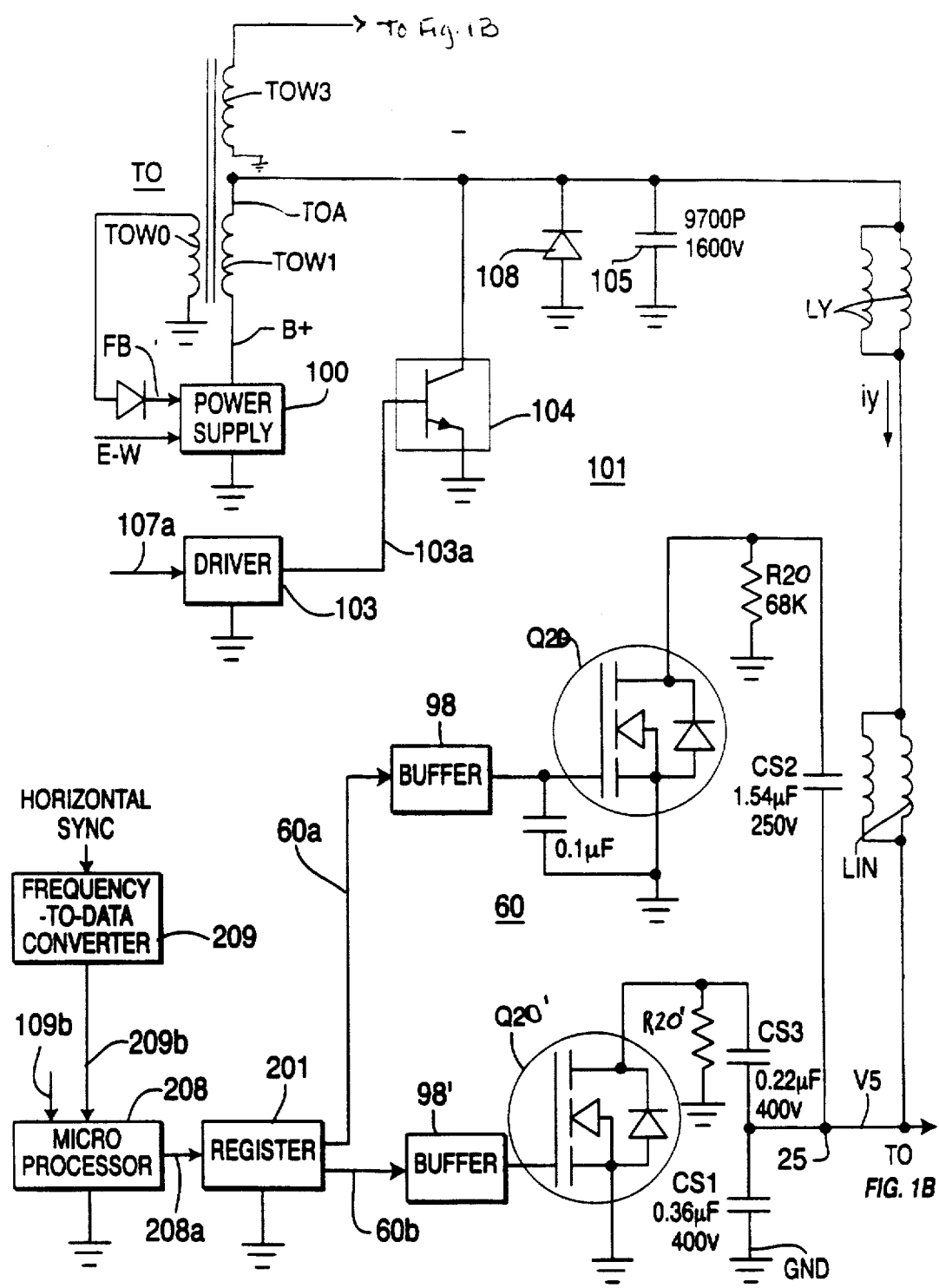
FIGS. 1A and 1B illustrate a horizontal deflection circuit output stage and a blanked dynamic focus power supply, in accordance with an inventive feature.

FIG. 1A illustrates a horizontal deflection circuit output stage 101 of a television receiver having multi-scan frequency capability. Stage 101 is energized by a regulated power supply 100 that generates a supply voltage B+. A conventional driver stage 103 is responsive to an input signal 107a at the selected horizontal scanning frequency $nf_H$. Driver stage 103 generates a drive control signal 103a to control the switching operation in a switching transistor 104 of output stage 101. By way of example, a value of n=1 may represent the horizontal frequency of a television signal according to a given standard such as a broadcasting standard. The collector of transistor 104 is coupled to a terminal T0A of a primary winding T0W1 of a flyback transformer T0. The collector of transistor 104 is also coupled to a non-switched retrace capacitor 105. The collector of transistor 104 is additionally coupled to a horizontal deflection winding LY to form a retrace resonant circuit. The collector of transistor 104 is also coupled to a conventional damper diode 108. Winding LY is coupled in series with a linearity inductor LIN and a non-switched trace or S-capacitor CS1. Capacitor CS1 is coupled between a terminal 25 and a reference potential, or ground GND such that terminal 25 is interposed between inductor LIN and S-capacitor CS1.

Output stage 101 is capable of producing a deflection current iy. Deflection current iy has substantially the same predetermined amplitude for any selected horizontal scan frequency of signal 103a selected from a range of $2f_H$ to $2.4f_H$ and for a selected horizontal frequency of $1f_H$. Controlling the amplitude of deflection current iy is accomplished by automatically increasing voltage B+ when the horizontal frequency increases, and vice versa, so as to maintain constant amplitude of deflection current iy. Voltage B+ is controlled by a conventional regulated power supply 100 operating in a closed-loop configuration via a feedback winding T0W0 of transformer T0. The magnitude of voltage B+ is established, in accordance with a rectified, feedback flyback pulse signal FB having a magnitude that is indicative of the amplitude of current iy. A vertical rate parabola signal E-W is generated in a conventional way, not shown. Signal E-W is conventionally coupled to power supply 100 for producing a vertical rate parabola component of voltage B+ to provide for East-West distortion correction.

A switching circuit 60 is used for correcting a beam landing error such as linearity. Circuit 60 selectively couples none, one or both of a trace or S-capacitor CS2 and a trace or S-capacitor CS3 in parallel with trace capacitor CS1. The selective coupling is determined as a function of the range of frequencies from which the horizontal scan frequency is selected. In switching circuit 60, capacitor CS2 is coupled between terminal 25 and a drain electrode of a field effect transistor (FET) switch Q20. A source electrode of transistor Q20 is coupled to ground GND. A protection resistor R20 that prevents excessive voltage across transistor Q20 is coupled across transistor Q20.

A register 201 applies switch control signals 60a and 60b. Control signal 60a is coupled via a buffer 98 to a gate electrode of transistor Q20. When control signal 60a is at a first selectable level, transistor Q20 is turned off. On the other hand, when control signal 60a is at a second selectable level, transistor Q20 is turned on. Buffer 98 provides the required level shifting of signal 60a to accomplish the above mentioned switching operation, in a conventional manner.

In switching circuit 60, capacitor CS3 is coupled between terminal 25 and a drain electrode of a FET switch Q20'. FET switch Q20' is controlled by control signal 60b in a similar way that FET switch Q20 is controlled by control signal 60a. Thus, a buffer 98' performs a similar function as buffer 98.

A microprocessor 208 is responsive to a data signal 209b generated in a frequency-to-data signal converter 209. Signal 209b has a numerical value that is indicative of the frequency of a synchronizing signal HORZ-SYNC or deflection current iy. Converter 209 includes, for example, a counter that counts the number of clock pulses, during a given period of signal HORZ-SYNC and generates word signal 209a in accordance with the number of clock pulses that occur in the given period. Microprocessor 208 generates a control data signal 208a that is coupled to an input of register 201. The value of signal 208a is determined in accordance with the horizontal rate of signal HORZ-SYNC. Register 201 generates, in accordance with data signal 208a, control signals 60a and 60b at levels determined by signal 208a, in accordance with the frequency of signal HORZ-SYNC. Alternatively, the value of signal 208a may be determined by a signal 109b that is provided by a keyboard, not shown.

When the frequency of horizontal deflection current iy is 1$f_H$, transistors Q20 and Q20' are turned on. The result is that both S-capacitors CS2 and CS3 are in-circuit S-capacitors that are coupled in parallel with non-switched S-capacitor CS1 and establish a maximum S-capacitance value. When the frequency of horizontal deflection current iy is equal to or greater than 2$f_H$ and less than 2.14$f_H$, transistor Q20 is turned off and transistor Q20' is turned on. The result is that S-capacitor CS2 is decoupled from non-switched S-capacitor CS1 and S-capacitor CS3 is coupled to S-capacitor CS1 to establish an intermediate S-capacitance value. When the frequency of horizontal deflection current iy is equal to or greater than 2.14$f_H$, transistors Q20 and Q20' are turned off. The result is that S-capacitors CS2 and CS3 are decoupled from non-switched S-capacitor CS1 and establish a minimum S-capacitance value. Deflection current iy in capacitor CS1, CS2 or CS3 produces an S-shaping parabolic voltage V5.

The total retrace capacitance formed by capacitor 105 does not change at the different scan frequencies. Therefore, the retrace interval has the same length at the different scan frequencies. The values of capacitors CS1, CS2 and CS3 are selected to produce parabolic voltage V5 at different amplitudes at different scan frequencies. The different amplitudes of voltage V5 are required because the retrace interval length is constant.

Figure 1B:
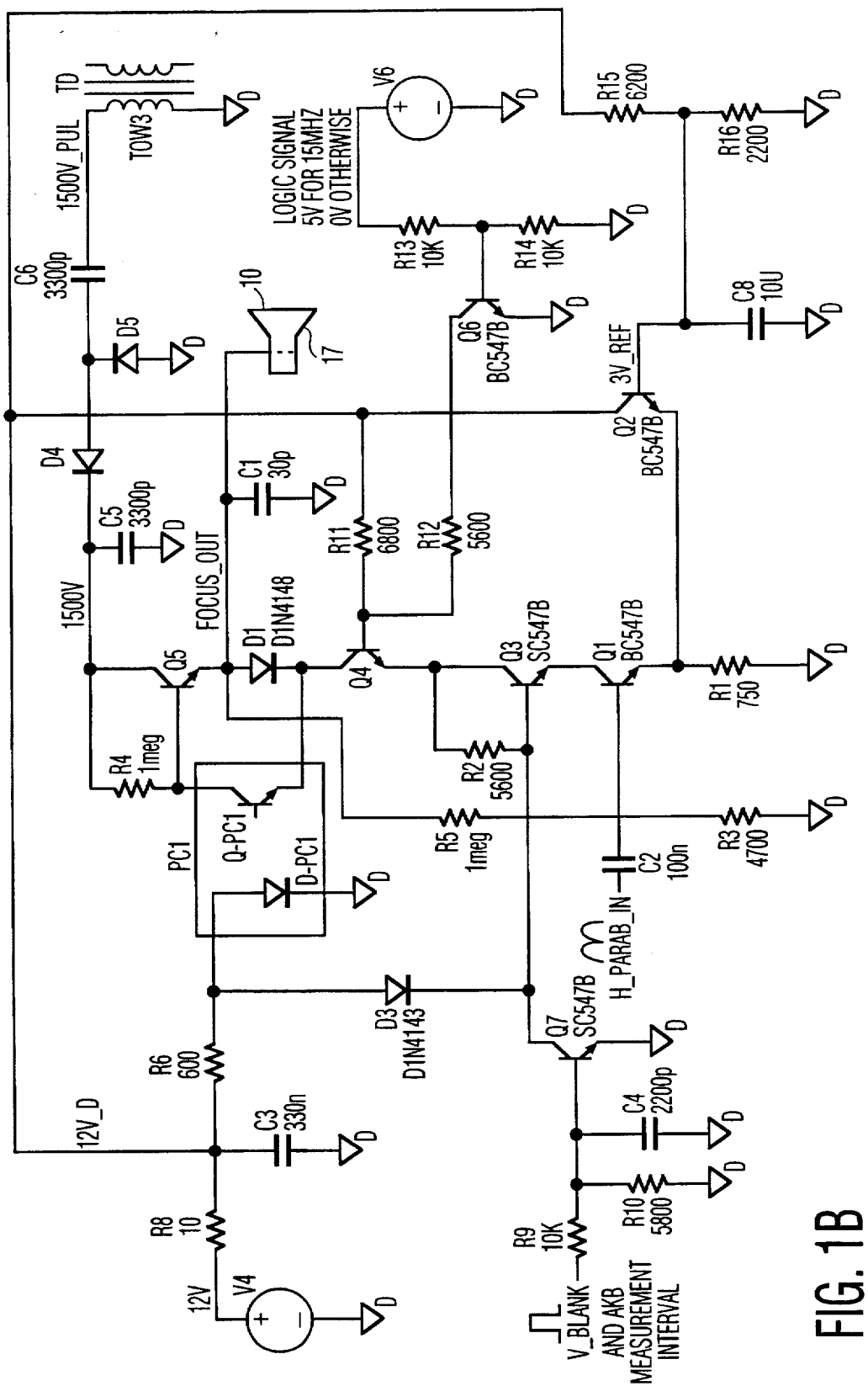

In FIG. 1B, a transistor Q1 and a transistor Q2 are coupled to each other to form a differential input stage. These transistors have very high collector current-to-base current ratio, referred to as beta, to increase the input impedance at the base of transistor Q1. The base-emitter junction voltages of transistors Q1 and Q2 compensate each other and reduce direct current bias drift with temperature changes. Resistor R15 and resistor R16 form a voltage divider that is applied to a supply voltage 12V_D at +12V for biasing the base voltage of transistor Q2 at about +3V. The value of an emitter resistor R1 that is coupled to the emitters of transistors Q1 and Q2 is selected to conduct a maximum current of about 6 mA. This protects a high voltage transistor Q4. Transistor Q4 is coupled to transistor Q1 via a transistor Q3 operating as a switch. Transistor Q4 is coupled to transistor Q1 via transistor Q3 in a cascode configuration. Transistor Q4 needs to be protected from being over-driven because transistor Q4 can tolerate only up to about 10 mA collector current. This is accomplished because the amplifier has high transconductance at a collector current of up to about 6 mA, and lower transconductance above about 6 mA. The cascode configuration of transistors Q4, Q3 and Q1 isolates the Miller capacitance, not shown, across the collector-base junction of transistor Q4; thereby, the bandwidth is increased. The cascode configuration also makes the amplifier gain independent of the low beta of high voltage transistor Q4.

A winding T0W3 of transformer T0 of FIG. 1A produces a stepped-up retrace voltage that is rectified in a diode D4 and filtered in a capacitor C5 to produce a supply voltage of about 1500 volts, for energizing the dynamic focus voltage generator of FIG. 1B. An active pull up transistor Q5 has a collector coupled to the supply voltage. A base pull-up resistor R4 of transistor Q5 is coupled to the supply voltage. A diode D1 is coupled between the collector of transistor Q4 and the emitter of transistor Q5

A capacitance C1 represents the sum of the stray capacitance of the focus electrode and of the wiring (not shown). Active pull-up transistor Q5 is capable of sourcing a current from its emitter to charge stray capacitance C1. Pull-down transistor Q4 is capable of sinking current via diode D1 from capacitance C1. Advantageously, the active pull up arrangement is used to obtain fast response time with lowered power dissipation. The dynamic focus amplifier uses shunt feedback for the output at the emitter of transistor Q5 via a feedback resistor R5.

A periodic control signal V_BLANK is at a HIGH state, during vertical blanking and during, for example, four video line times that follow the vertical blanking, referred to as the AKB measurement interval, not shown. Signal V_BLANK is delayed by a delay circuit (not shown) that delays a conventional vertical blanking signal V_BLANK by a suitable number of video line times such as four. The delayed signal is coupled to the base of a switch transistor Q7. The collector of transistor Q7 is coupled to the base of transistor Q3. During vertical blanking and during the AKB measurement interval, transistor Q3 is turned off by transistor Q7.

The class B amplifier shown in FIG. 1B embodies an aspect of the invention. Normally, this type of amplifier uses separate pull up transistor Q5 and pull down transistor Q4 to alternately charge and discharge a capacitive load, the focus electrode 17 of a CRT 10. The capacitive load is shown as capacitor C1.

A voltage drop in resistor R4 can then be chosen such that a desirable output voltage near to the maximum peak of the normal dynamic focus waveform is maintained during vertical blanking. Unfortunately, the current required to do this with a 1 Meg value of resistor R4 is very small, and is much less than the average current drawn by the amplifier during normal dynamic focus operation. It is desired to make the current during vertical blanking nearly equal to the average current drawn during normal dynamic focus operation.

To accomplish this goal and maintain a focus output voltage nearly equal to the positive peak of the normal dynamic focus waveform, it is necessary to turn on transistor Q5 during vertical blanking. For example, if the focus parabola fundamental frequency at the input, H_PARAB_IN, is 31 kHz, then the average current during normal dynamic focus operation might be, for example, 2 mA. Therefore, 2 mA will need to be drawn during vertical blanking in order to make the power supply loading consistent and free of transients.

However, with transistor Q5 non-conductive, as would occur if the transistor in photo coupler PC1, Q-PC1, is on, as it is in normal dynamic focus operation, then 2 mA would cause up to a 2 kV voltage drop across 1 meg ohm pull up resistor R4. Since only 1500 V is available, the current source transistor Q4 will saturate and the focus output will be near 12 volts during vertical blanking.

The vertical blanking drive is a positive going 5 volt or greater pulse that appears during the vertical retrace time at input V_BLANK and turns transistor Q7 on. Normally the light emitting diode in photo coupler PC1, D-PC1, is conducting about 15 mA from the 12 V supply V4 through resistors R8 and R6. This current provides light flux to keep the transistor Q-PC1 conducting. When transistor Q7 conducts, this current is shunted away from the diode D-PC1 into diode D3 and transistor Q7. This method of switching maintains the current through resistors R6 and R8 nearly constant so that the voltage drop across resistor R8 does not greatly change during vertical retrace. A change in the voltage drop across R8 would also alter the 3V_REF derived from the resistor divider R15 and R16. This 3V_REF regulates the amplitude of supply 12V_D.

Conduction of transistor Q7 also causes transistor Q3 to turn off by forcing its base voltage to be near ground. The transistor Q3 emitter is held near 3 volts by forward conduction of the collector base junction of transistor Q1 and the charge on coupling capacitor C2. At the junction of the emitter of transistor Q4, the collector of transistor Q3 and resistor R2, the voltage is held near 11 volts because the base current of Q4 is small and causes very little voltage drop across resistor R11.

Transistor Q6 is off for scan modes other than 15 kHz conventional broadcast TV. During vertical blanking, Q3 serves to disconnect the normal feedback gain control loop of the focus amplifier consisting of R5, R3, R1, Q1 and Q2. Current through resistor R2 and Q7 to ground is substituted. Simultaneously, transistor Q-PC1 turns off to allow transistor Q5 to turn on. The focus output goes to 1500 V with 2 mA drawn as required to prevent transients.

For horizontal scan frequencies in the range of 31 kHz to 38 kHz, the amplifier average current changes. However, one value of resistor R2 is sufficient to minimize transients to an acceptable level. At the conventional TV scan frequency of 15 kHz, the amplifier power and average current is about half. In this mode, transistor Q6 turns on and reduces the voltage at the base of transistor Q4 to about half its former value. This action reduces the current in resistor R2 so that the amplifier average current is matched at this scan frequency.

What is claimed is:

1. A video imaging apparatus, comprising:
   a cathode-ray tube including a focus electrode;
   a source of a focus voltage correction input signal;
   a deflection circuit;
   an amplifier drawing a current from said deflection circuit and having a first input responsive to said focus voltage correction input signal for generating at an output of said amplifier a dynamic focus voltage component of a focus voltage that is coupled to said focus electrode;
   a first semiconductor switch responsive to a periodic control signal and coupled to a signal path of said focus voltage correction input signal for disabling said dynamic focus voltage component, during an automatic kine bias measurement interval of a deflection cycle; and
   means responsive to said first semiconductor switch for controlling the current, drawn by said amplifier from said deflection circuit during said automatic kine bias measurement interval, to a value substantially equal to the average value of current drawn by said amplifier when said dynamic focus voltage component is not disabled.

2. The apparatus according to claim 1, wherein said means for controlling the current drawn by said amplifier comprises a resistor coupled in the path of the current drawn by said amplifier.

3. The apparatus according to claim 2, wherein said amplifier comprises a first transistor and a second transistor having their main current conducting paths coupled to said focus electrode, both of said transistors being conductive during said automatic kine bias measurement interval.

4. The apparatus according to claim 3, comprising means for coupling said resistor to a voltage reference during said automatic kine bias measurement interval.

5. A video imaging apparatus comprising:
   a cathode ray tube including a focus electrode;
   a source of focus correction input signal;
   a first transistor responsive to said input signal and coupled to said focus electrode to supply current in a first direction by forming an active pull-up arrangement;
   a second transistor responsive to said input signal and coupled to said focus electrode to supply current in an opposite direction by forming an active pull-down arrangement;
   said first and second transistors forming an amplifier developing a dynamic focus voltage at said focus electrode;
   a source of periodic focus voltage blanking signal coupled to said first and second transistors to interrupt development of said dynamic focus voltage, and
   means responsive to said blanking signal for maintaining current conduction in said first transistor during focus voltage blanking at a value substantially equal to the average value of current drawn by said amplifier when said dynamic focus voltage is not interrupted.

6. The apparatus according to claim 5, comprising means responsive to said blanking signal for maintaining conduction of said second transistor during focus voltage blanking.

7. The apparatus according to claim 6, comprising a resistor coupled in the path of main current conduction of said second transistor for controlling the current therein during focus voltage blanking.

8. The apparatus according to claim 6, comprising a resistor coupled in the path of main current conduction of said first and second transistors for controlling the current therein during focus voltage blanking.

* * * * *